United States Patent
Weber et al.

(10) Patent No.: US 11,543,655 B1
(45) Date of Patent: Jan. 3, 2023

(54) RENDERING FOR MULTI-FOCUS DISPLAY SYSTEMS

(71) Applicant: Apple Inc., Cupertino, CA (US)

(72) Inventors: Andreas G. Weber, Los Altos, CA (US); Tobias Eble, Sunnyvale, CA (US); Yury A. Petrov, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 16/556,641

(22) Filed: Aug. 30, 2019

Related U.S. Application Data

(60) Provisional application No. 62/728,386, filed on Sep. 7, 2018.

(51) Int. Cl.
| | | |
|---|---|---|
| *G02B 27/00* | (2006.01) | |
| *H04N 13/271* | (2018.01) | |
| *H04N 13/268* | (2018.01) | |
| *H04N 13/236* | (2018.01) | |
| *G02B 27/01* | (2006.01) | |
| *G06T 7/194* | (2017.01) | |

(52) U.S. Cl.
CPC ..... *G02B 27/0075* (2013.01); *G02B 27/0093* (2013.01); *G02B 27/0172* (2013.01); *G06T 7/194* (2017.01); *H04N 13/236* (2018.05); *H04N 13/268* (2018.05); *H04N 13/271* (2018.05); *G02B 2027/014* (2013.01); *G02B 2027/0138* (2013.01)

(58) Field of Classification Search
CPC ............ G02B 27/0075; G02B 27/0093; G02B 27/0172; G02B 2027/0138; G02B 2027/014; G06T 7/194; H04N 13/268; H04N 13/236; H04N 13/271
See application file for complete search history.

(56) References Cited

U.S. PATENT DOCUMENTS

| | | | | |
|---|---|---|---|---|
| 9,865,043 | B2 | 1/2018 | Robinson et al. | |
| 10,096,122 | B1 * | 10/2018 | Agrawal | G06T 7/90 |
| 10,832,427 | B1 * | 11/2020 | Eble | G02B 27/017 |

(Continued)

OTHER PUBLICATIONS

Rolland, Jannick P., Krueger, Myron W. and Goon Alexei A., "Dynamic Focusing in Head-Mounted Displays",; Part of the IS&T/SPIE Conference on the Engineering Reality of Virtual Reality 1999, San Jose, CA, Jan. 1999. SPIE vol. 3639; pp. 463-470.

*Primary Examiner* — Antoinette T Spinks
(74) *Attorney, Agent, or Firm* — Thompson Hine LLP

(57) ABSTRACT

Some implementations provide a multi-focus display system that renders images at multiple focus distances for display in conjunction with the use of appropriately powered lenses. For example, an HMD may include a fast switching lens element that allows quickly alternating between two or more focus distances. The displayed images are configured to correspond to the alternating focus distances by adjusting a high-frequency part of the images. This can provide a more natural user experience that will include near objects that require the user's eye to focus on a close focal depth plane and far objects that require the user's eye to focus on a far focal depth plane. Moreover, the user experience can be provided with little or no loss of brightness and without requiring processor and resource intensive computations.

21 Claims, 9 Drawing Sheets

(56) References Cited

U.S. PATENT DOCUMENTS

| | | | |
|---|---|---|---|
| 2013/0148851 A1* | 6/2013 | Leung | G06K 9/3241 |
| | | | 382/103 |
| 2014/0267243 A1* | 9/2014 | Venkataraman | H04N 13/106 |
| | | | 345/419 |
| 2016/0191905 A1* | 6/2016 | Robinson | G06T 5/50 |
| | | | 348/46 |
| 2017/0010469 A1 | 1/2017 | Samec et al. | |
| 2021/0185303 A1* | 6/2021 | Valli | H04N 13/398 |
| 2021/0223680 A1* | 7/2021 | Han | B23K 26/06 |

* cited by examiner

Image

Depth Image

Foreground Mask $I'_A$ $I'_B$ $I'_A + I'_B$

Reference Image

RENDERING FOR MULTI-FOCUS DISPLAY SYSTEMS

CROSS-REFERENCE TO RELATED APPLICATION

This application claims the benefit of U.S. Provisional Application Ser. No. 62/728,386 filed Sep. 7, 2018, which is incorporated herein in its entirety.

TECHNICAL FIELD

The present disclosure generally relates to providing user experiences on head mounted devices (HMDs), and in particular, to systems, methods, and devices for rendering images on such devices.

BACKGROUND

Head mounted devices (HMDs) present images that are viewed by the eyes of users at relatively close range. Directly focusing on such close range images is undesirable or impossible for most users. To ease the burden on the users' eyes, HMDs typically present images that are warped or otherwise distorted and provide lenses that provide the users with undistorted views of those images. The lenses undistort the images presented on the displays for near eye viewing, e.g., bending the light from the displays that are relatively close to the users' eyes to make it easier for the users to focus on and see the images presented on the displays as if the users were looking at objects further away from the users' eyes, e.g., on a focal depth plane located significantly further away from the user's eyes.

Many HMDs use a fixed focal distance. All of the objects of the images are projected onto the same focal depth plane, e.g., appearing to the user as if on a screen 6 feet away rather than on the actual display which may be only inches away. All of the objects are also in focus. The use of a single plane in which all objects are in focus can provide an unnatural viewing experience. For example, in a natural viewing environment, when a user looks from a nearby object to an object that is farther away, the user's eye must accommodate (e.g., the user's eye's lens changes shape to allow the user to focus on the far away object). In contrast, when using an HMD that has a fixed focal distance and a single focal depth plane, when the user looks from a part of the image depicting a nearby object to a part of the image depicting a farther away object, the user's eye does not need to change shape. This lack of required eye accommodation can conflict with the change in convergence angle experienced by the user's eyes when viewing 3D content. This conflict is referred to as "vergence accommodation conflict" or "VAC." Additionally, in a natural viewing environment, when the user is focused on a nearby object, objects that are farther away may appear fuzzy or out of focus to the user and vice versa. Such a viewing experience is different than that of using an HMD in which all objects are always in focus and may thus also result in an unnatural feeling to the user.

Multi-focal display systems can display images at multiple focal distances. However, these systems have various disadvantages, for example, requiring high computation and resource costs, reducing the overall brightness of the content presented, or inducing flickering.

SUMMARY

Various implementations disclosed herein include devices, systems, and methods that provide a multi-focus display system that can display images at multiple focus distances on HMDs. The images are pre-processed to be displayed on multiple focal depth planes and displayed in conjunction with the use of appropriately powered lenses. The focal depth planes used may alternate over time. For example, a first image may be pre-processed to facilitate viewing of nearby objects using a short distance focal depth plane, a second image may be pre-processed to facilitate viewing of far-away objects using a more distant focal depth plane, and a third image may be processed to facilitate viewing using the short distance focal depth plane again, etc. These images are then presented in conjunction with the use of an appropriate powered lens. For example, the first image may be displayed while a lens power associated with the short distance plane is active in the HMD, and the second image may be displayed while a lens power associated with the more distant plane is active in the HMD, etc. If the frame rate of the alternating images is sufficiently fast, the user experience will include near objects that require the user's eye to focus on a close focal depth plane and far objects that require the user's eye to focus on the far focal depth plane. The required eye accommodation may be more natural or otherwise pleasing to the user.

Some implementations provide a multi-focus display system that can display alternating images at multiple focus distances on HMDs with little or no reduction in overall brightness and without high computation costs. The alternating images are created for alternating focal depth planes by boosting the high-frequency parts of different parts of the images. For example, some portions of an image may be assigned to a close focal depth plane and other portions of an image to a far focal depth plane. The image is split in frequency space into a low frequency part and a high-frequency part. For a close focal depth plane version of the image, the high-frequency part of the near focal depth plane portions is boosted and the high-frequency part of the far focal depth plane portions is reduced. Conversely, for a far focal depth plane version of the image, the high-frequency part of the near focal depth plane portions is reduced and the high-frequency part of the far focal depth plane portions is boosted. Alternating images (e.g., close focal depth plane, far focal depth plane, close focal depth plane, etc.) can thus be created in which the relevant portions of the images have the high-frequency boosted or reduced. When a user focuses on a close object (e.g., in a close portion), the boosted high-frequency part in close focal depth plane versions of the image is greater than the reduced high-frequency part in the far plane versions of the image. This results in the user viewing the object in focus on the close focal depth plane. Similarly, when the user focuses on a far object (e.g., in a far portion), the boosted high-frequency part in far focal depth plane versions of the image is greater than the reduced high-frequency part in the close plane versions of the image. This results in the user viewing the object on the far focal depth plane. The user's eye must accommodate to the appropriate focal plane, resulting in a natural viewing experience with little or no reduction in the overall brightness of the images or flicker that might otherwise be caused by alternating near-object-only images with far-object-only images.

In some implementations, a user experience is provided by a device having a processor and a non-transitory computer-readable storage medium. The device obtains a sequence of images of a scene such as a sequence of 3D or computer generated reality (CGR) content images to be rendered on a display of an HMD at 120 fps. The device determines portions (e.g., pixels) of the images associated with each of multiple (e.g., two or more) focal depth planes. For example, some pixels of each image may be in a foreground plane and some pixels may be in a background plane. Determining which portions to associate with each focal depth plane may involve using depth maps, analyzing depth distributions, or creating focal depth plane-specific masks (e.g., a foreground mask, a background mask, a mid-focus-range mask, etc.). The device creates adjusted images by adjusting (e.g., reducing or boosting) a high-frequency part of the images. The high-frequency part of each portion is adjusted based on which of the multiple focal depth planes is associated with the respective portion. For example, in some frames, the high-frequency part is boosted for close portions and reduced for far portions, while in other frames the high-frequency part is reduced for close portions and boosted for far portions. The device provides the adjusted images for sequential display on a HMD (e.g., on the same device or another device).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
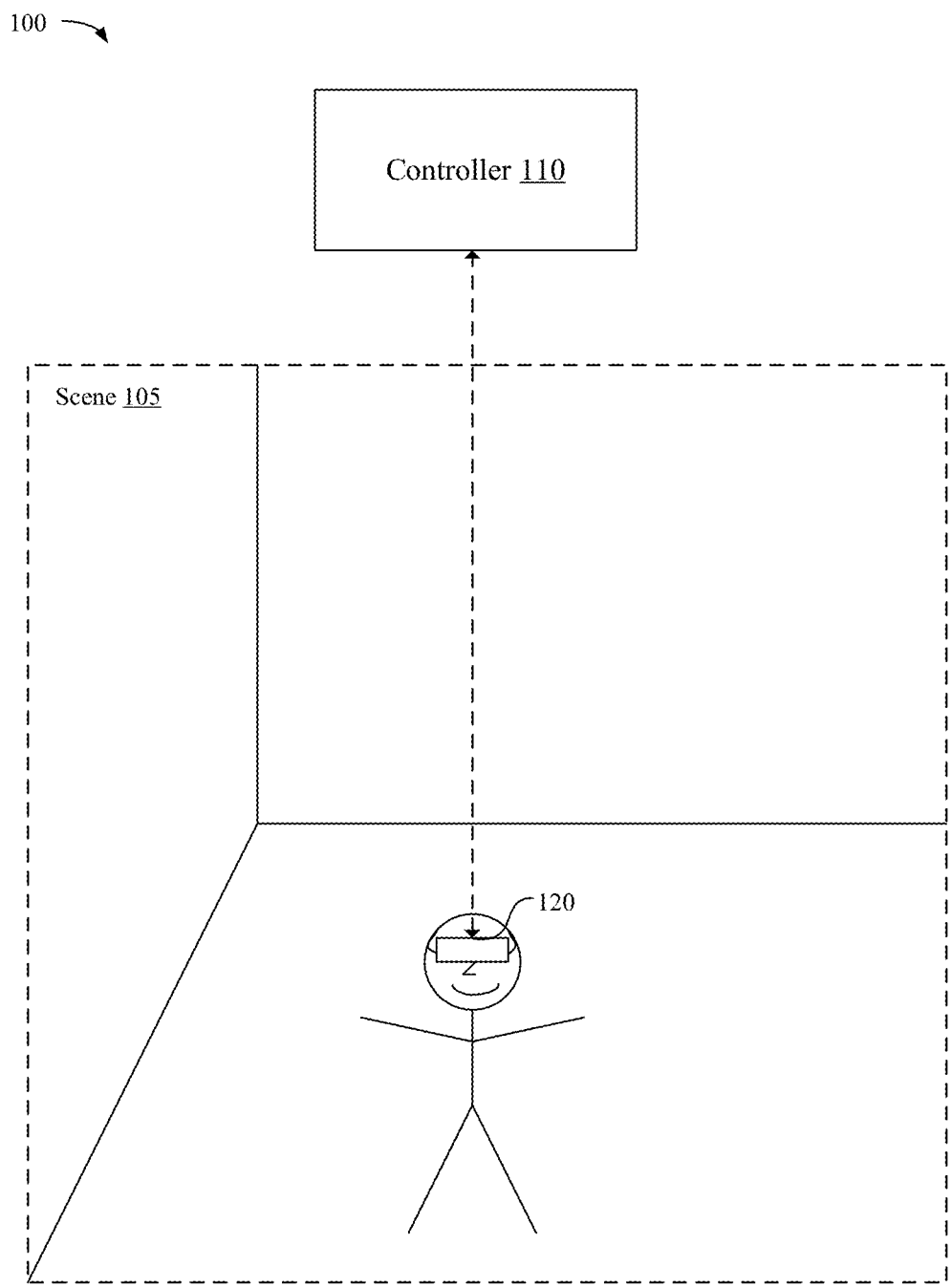
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that provide improved user experiences on HMDs. In some implementations, a multi-focus display system renders images at multiple focus distances for display in conjunction with the use of appropriately powered lenses. For example, an HMD may include a fast switching lens element that allows quickly alternating between two or more focus distances. The displayed images are configured to correspond to the alternating focus distances by adjusting a high-frequency part of the images. This can provide a more natural user experience that will include near objects that require the user's eye to focus on a close focal depth plane and far objects that require the user's eye to focus on a far focal depth plane. Moreover, the user experience can be provided with little or no loss of brightness and without requiring processor and resource intensive computations.

The techniques disclosed herein are not limited to two pre-determined focus distances. Any number of focus distances corresponding to different lens power states can be used, for example, by using additional switchable lenses or a variable (e.g., motorized) adjustable focus. In some implementations, a switchable lens has a global focal distance, changing the focus distance for the entire display area of the current image. In other implementations, a switchable lens has a local effect on focus distance, for example, changing the focus distance for only a pixel or group of pixels.

FIG. 1 is a block diagram of an example operating environment 100 in accordance with some implementations.

While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some implementations, the controller 110 is configured to manage and coordinate a user experience for a user. In some implementations, the controller 110 includes a suitable combination of software, firmware, or hardware. The controller 110 is described in greater detail below with respect to FIG. 2. In some implementations, the controller 110 is a computing device that is local or remote relative to the scene 105. In one example, the controller 110 is a local server or other device located within the scene 105. In another example, the controller 110 is a remote server or other device located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the HMD 120 is configured to present the user experience to the user. In some implementations, the HMD 120 includes a suitable combination of software, firmware, or hardware. In some implementations, the user wears the HMD 120 on his/her head. As such, the HMD 120 includes one or more displays provided to display images. The HMD 120 may enclose the field-of-view of the user. The HMD 120 is described in greater detail below with respect to FIG. 3. In some implementations, the functionalities of the controller 110 are provided by or combined with the HMD 120, for example, into an HMD.

According to some implementations, the HMD 120 presents a computer-generated reality (CGR) environment. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. As used herein, an HMD in which at least some light of the physical environment may pass through a transparent or translucent display is called an "optical see through" HMD.

Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
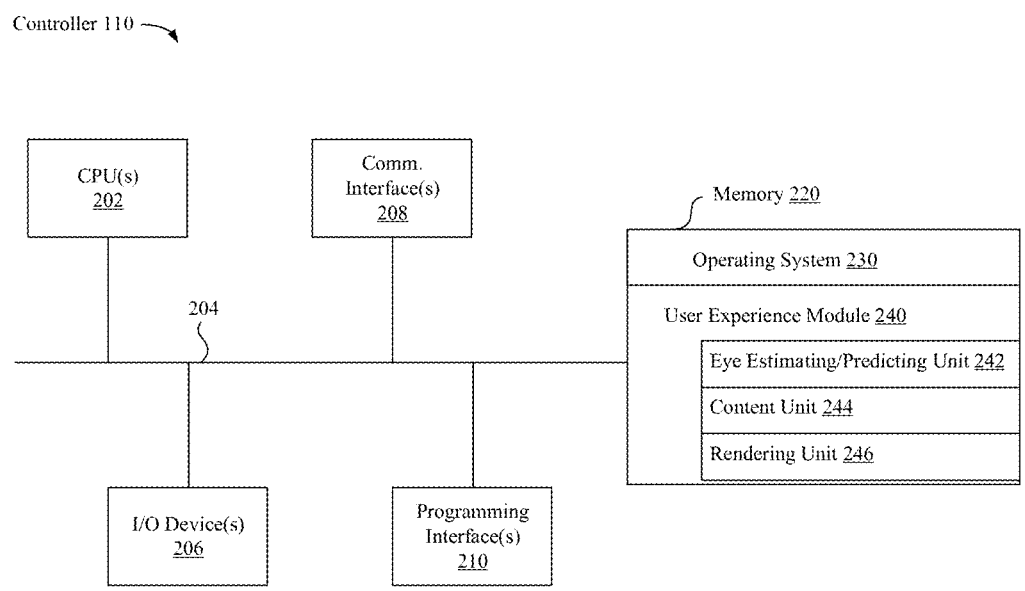
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a user experience module 240.

The operating system 230 includes procedures for handling various basic system services and for performing hardware dependent tasks. In some implementations, the user experience module 240 is configured to manage and coordinate one or more user experiences for one or more users (e.g., a single user experience for one or more users, or multiple user experiences for respective groups of one or more users). The user experience module 240 can be configured to facilitate rendering for multi-focus displays. To that end, in various implementations, the user experience module 240 includes an eye estimating/predicting unit 242, a content unit 244, and a rendering unit 246.

In some implementations, the eye estimating/predicting unit 242 is configured to obtain data (e.g., eye tracking data, interaction data, sensor data, location data, etc.) from at least the HMD 120 and to use that data to provide estimations or predictions of eye characteristics, (e.g., pupil location, gaze direction, eye convergence, eye focus state, etc.). To that end, in various implementations, the eye estimating/predicting unit 242 includes instructions or logic therefor, and heuristics and metadata therefor.

In some implementations, the content unit 244 is configured to obtain or create content (e.g., 2D or 3D models based on images or virtual content from other devices or sensors on the HMD 120 or other sources). To that end, in various implementations, the content unit 244 includes instructions or logic therefor, and heuristics and metadata therefor.

In some implementations, the rendering unit 246 is configured to obtain content from the content unit 244 to configure renderings based on the content (e.g., create 2D images of 3D models from particular viewpoints, lighting, and using other conditions or modify versions of 2D images) for display on the HMD 120. The rendering unit 246 may adjust the renderings/images based on the state of one or more lenses of the HMD 120 and other factors. In some implementations, the rendering unit 246 configures a sequence of images to have alternating focus distance characteristics corresponding to alternating lens states that will be used in displaying the images at the HMD 120. To that end, in various implementations, the rendering unit 246 includes instructions or logic therefor, and heuristics and metadata therefor.

Although the eye estimating/predicting unit 242, content unit 244, and rendering unit 246 are shown as residing on a single device (e.g., the controller 110), it should be understood that in other implementations, any combination of these units may be located in separate computing devices.

Moreover, FIG. 2 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 3:
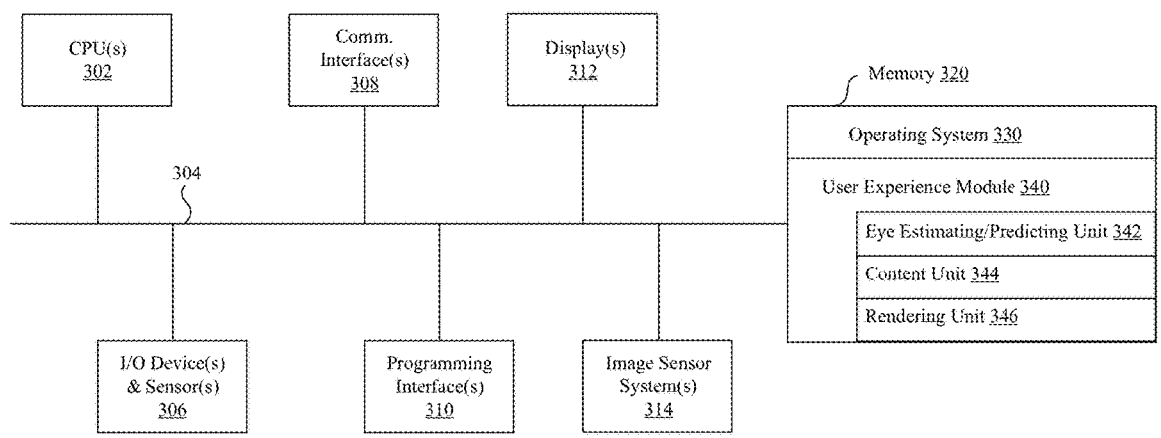
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the HMD 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a user experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), a retinal projection system, or the like display types. In some implementations, the one or more displays 312 correspond to diffractive, reflective, polarized, holographic, or waveguide displays. In one example, the HMD 120 includes a single display. In another example, the HMD 120 includes a display for each eye of the user. In some implementations, the one or more displays 312 are capable of presenting CGR content.

In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a user experience module 340.

The operating system 330 includes procedures for handling various basic system services and for performing hardware dependent tasks. In some implementations, the user experience module 340 is configured to present a user experience using a rendering unit configured for multi-focus display via the one or more displays 312. To that end, in various implementations, the user experience module 340 includes eye estimating/predicting unit 342, a content unit 344, and a rendering unit 346.

In some implementations, the eye estimating/predicting unit 342 is configured to obtain data (e.g., eye tracking data, interaction data, sensor data, location data, etc.) and to use that data to provide estimations or predictions of eye characteristics, e.g., pupil location, gaze direction, eye convergence, eye focus state, etc. To that end, in various implementations, the eye estimating/predicting unit 342 includes instructions or logic therefor, and heuristics and metadata therefor.

In some implementations, the content unit 344 is configured to obtain or create content (e.g., 2D or 3D models based on images or virtual content from other devices or sensors on the HMD 120 or other sources). To that end, in various implementations, the content tracking unit 344 includes instructions or logic therefor, and heuristics and metadata therefor.

In some implementations, the rendering unit 346 is configured to obtain content from the content unit 344 to configure renderings based on the content (e.g., to create 2D images of 3D models from particular viewpoints, lighting, and using other conditions or modify versions of 2D images) for display. The rendering unit 346 may adjust the renderings/images based on the state of one or more lenses of the HMD 120 and other factors. In some implementations, the rendering unit 346 configures a sequence of images to have alternating focus distance characteristics corresponding to alternating lens states that will be used in displaying the images at the HMD 120. To that end, in various implementations, the rendering unit 346 includes instructions or logic therefor, and heuristics and metadata therefor.

Although the eye estimating/predicting unit 342, content unit 344, and rendering unit 346 are shown as residing on a single device (e.g., the HMD 120), it should be understood that in other implementations, any combination of these units may be located in separate computing devices.

Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
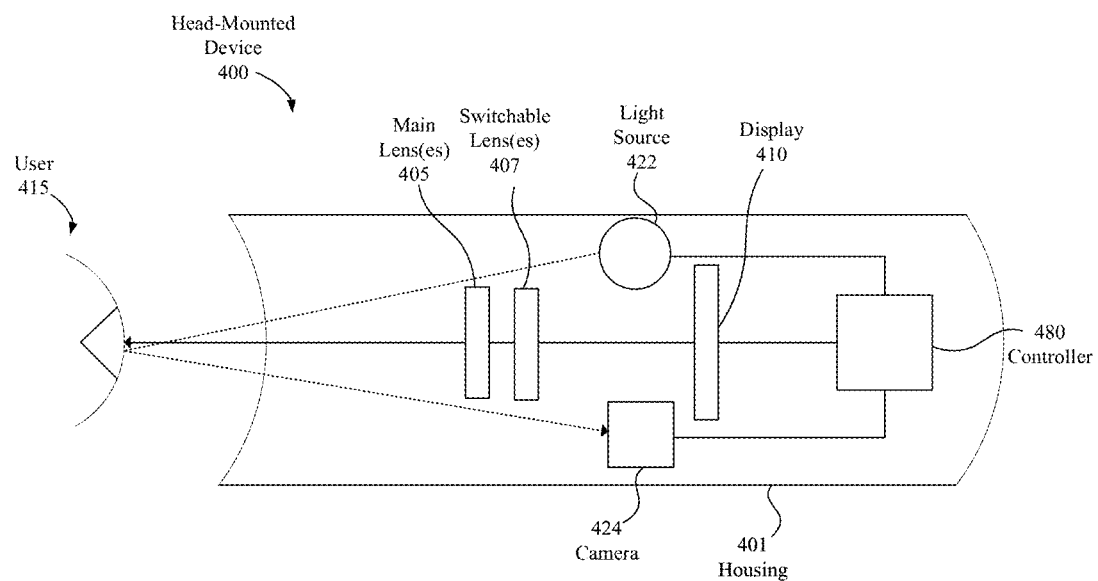
FIG. 4 is a block diagram of an example head-mounted device (HMD) in accordance with some implementations.

FIG. 4 illustrates a block diagram of another exemplary head-mounted device 400 in accordance with some implementations. The head-mounted device 400 includes a housing 401 (or enclosure) that houses various components of the head-mounted device 400. The housing 401 includes (or is coupled to) an eye pad (not shown) disposed at a proximal (to the user 415) end of the housing 401. In various implementations, the eye pad is a plastic or rubber piece that comfortably and snugly keeps the head-mounted device 400 in the proper position on the face of the user 415 (e.g., surrounding the eye of the user 415).

The housing 401 houses a display 410 that displays an image, emitting light towards or onto the eye of a user 415. In various implementations, the display 410 emits the light through an eyepiece having one or more main lens(es) 405 and one or more switchable lens(es) that refracts the light emitted by the display 410, making the display appear to the user 415 to be at a virtual distance farther than the actual distance from the eye to the display 410. For the user to be able to focus on the display 410, the virtual distance is at least greater than a minimum focal distance (e.g., 7 cm, 1 m, etc.). In some implementations, the focal distances switches between two or more such focal distances based on switching of the one or more switchable lenses 407. One example of switchable lenses involves lenses that use fast polarization switches to change the power of geometric phase lenses. Another example of switchable lenses involves multiple lens/display combinations that are switched based, for example, using mirrors that change the current user view from one lens/display combination to another mirror/lens combination.

The housing 401 also houses a tracking system including one or more light sources 422, camera 424, and a controller 480. The one or more light sources 422 emit light onto the eye of the user 415 that reflects as a light pattern (e.g., a circle of glints) that can be detected by the camera 424. Based on the light pattern, images of the eye, or other information, the controller 480 can determine an eye tracking characteristic of the user 415. For example, the controller 480 can determine a gaze direction or a blinking state (e.g., eyes open or eyes closed) of the user 415. As another example, the controller 480 can determine a pupil center, a pupil size, or a point of regard. The gaze direction of both of the user's eyes can be determined using one or more tracking systems and used to determine a convergence angle. The focus state of the eye (e.g., which object the eye is focusing on, the state of the eye focus, etc.) can also be determined based on tracked eye characteristics. In various implementations, the light is emitted by the one or more light sources 422, reflects off the eye of the user 415, and is detected by the camera 424. In various implementations, the light from the eye of the user 415 is reflected off a hot mirror or passed through an eyepiece before reaching the camera 424.

The display 410 emits light in a first wavelength range and the one or more light sources 422 emit light in a second wavelength range. The camera 424 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 415 selects an option on the display 410 by looking at it), provide foveated rendering (e.g., present a higher resolution in an area of the display 410 the user 415 is looking at and a lower resolution elsewhere on the display 410), or determine convergence of the eyes or otherwise estimate focus distance.

In various implementations, the one or more light sources 422 emit light towards the eye of the user which reflects in the form of a plurality of glints.

In various implementations, the camera 424 is a frame/shutter-based camera that, at a particular point in time or multiple points in time at a frame rate, generates an image of the eye of the user 415. Each image includes a matrix of pixel values corresponding to pixels of the image which correspond to locations of a matrix of light sensors of the camera.

In various implementations, the camera 424 is an event camera comprising a plurality of light sensors (e.g., a matrix of light sensors) at a plurality of respective locations that, in response to a particular light sensor detecting a change in intensity of light, generates an event message indicating a particular location of the particular light sensor.

Figure 5:
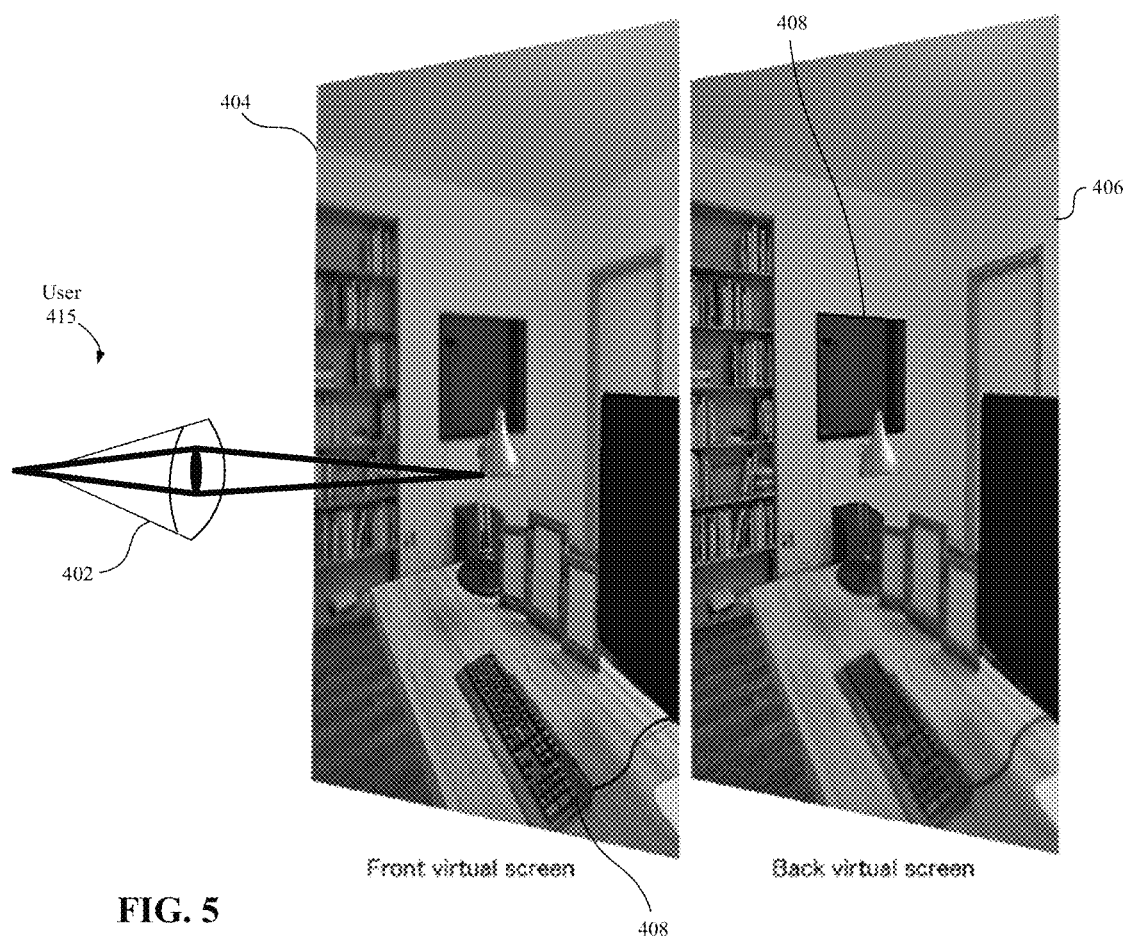
FIG. 5 is a block diagram illustrating how a human eye perceives an image in a multi-focus display system in accordance with some implementations.

FIG. 5 is a block diagram illustrating how a human eye 402 perceives an image in a multi-focus display system in accordance with some implementations. In this example, the target display system (e.g., HMD 120) has a fast switching lens element, which allows it to quickly alternate between two focus distances. In this example, the focus distance is alternated in each frame. The eye 402 sees a combination of the virtual front virtual screen 404 and back virtual screen 406. When focusing on the front virtual screen 404, objects close to the front plane (e.g., object 406) should appear sharp while objects closer to the back plane (e.g., object 408) should appear blurred, when focusing on the back virtual plane, objects closer to the back plane (e.g., object 408) should appear sharp while objects closer to the front plane (e.g., object 406) should appear blurred.

Figure 6:
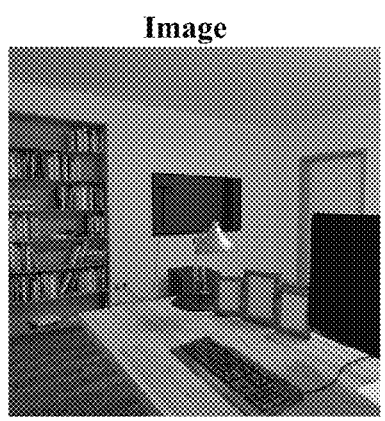
FIG. 6 is an example image.

FIGS. 6-12 illustrate an exemplary technique for configuring alternating images (e.g., a near focal depth plane image, a far focal depth plane image, a near focal depth plane image, etc.) to provide a user experience like the user experience illustrated in FIG. 5. FIG. 6 is an example image that can be used as the source of one or more of the configured images used by the multi-focus display system. In use, the technique may be applied to images of a sequence of images, converting the first image of the sequence to a near focal depth plane image, converting the second image of the sequence to a far focal depth plane image, and converting the third image of the sequence to a near focal depth plane image, etc. Alternatively, each image of the sequence may be converted into both a near focal depth plane image and a far focal depth plane image and displayed consecutively for half of the normal display time.

An image-plane specific version or versions of an image is created, in some implementations, by determining portions (e.g., pixels) of the image associated with each of multiple focal depth planes. For example, some pixels of the image may be assigned to foreground plane and some pixels may be assigned to a background plane. An exemplary technique for associating portions (e.g., pixels) of the image with each of multiple focal depth planes is discussed below with respect to FIGS. 7-9.

An adjusted image is then created by adjusting (e.g., reducing or boosting) a high-frequency part of the image. Specifically, the high-frequency part of each portion is adjusted based on which of the multiple focal depth planes is associated with the respective portion. Thus, for example, for a near focal depth plane version of the image, the high-frequency part is boosted for near portions and reduced for far portions, while for a far focal depth plane version of the image, the high-frequency part is reduced for near portions and boosted for far portions. An exemplary process of adjusting an image is discussed below with respect to FIGS. 10-15.

Technique for Associating Image Portions with Different Focal Depth Planes

Various techniques may be applied to determine to which focal depth plane of multiple focal depth planes to assign each portion (e.g., pixel) of the image. Some implementations determine pixel focal depth plane assignments based on depths associated with different portions (e.g., pixels) of the image. Such techniques may involve obtaining and analyzing depth values, depth images, and depth histograms and may result in the creation of one or more masks that identify portions of the image associated with the different focal depth planes.

In some implementations, depth data is obtained from sensors or 3D models of the content of an image. Some or all of the content of an image can be based on a real environment, for example, depicting the scene 105 around the HMD 120. Image sensors may capture images of the scene 105 for inclusion in the image and depth information about the scene 105 may be determined. In some implementations, a depth sensor on the HMD 120 determines depth values for pixels of images captured by an image sensor on the HMD 120. The scene 105 around the user may be 3D modeled based on one or more values and subsequent depths of objects depicted in subsequent images of the scene can be determined based on the model and camera position information. Virtual objects in a CGR environment may have pre-assigned depth values or coordinates from which such depth values can be determined. In some implementations, depth data (e.g., associated with content of a scene or model) is directly analyzed to separate the image portions (e.g., pixels) into foreground and background. For example, a predetermined threshold or thresholds may be used to make such separations.

Figure 7:
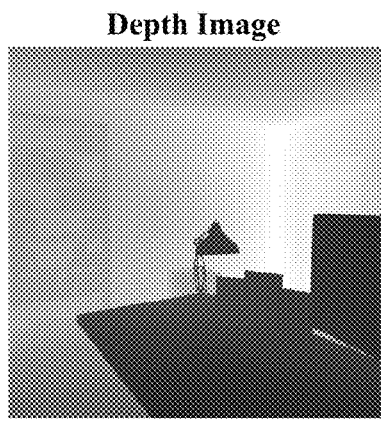
FIG. 7 is an example depth image based on the example image of FIG. 6 in accordance with some implementations.

In some implementations, the depth data is represented in a depth map that is used to separate the image portions into different focal depth planes. FIG. 7 is an example depth image based on the example image of FIG. 6. In FIG. 7, the shading of the pixels in the image corresponds to the relative depth of the pixels in the image, e.g., the relative distance from the camera position associated with the image.

Figure 8:
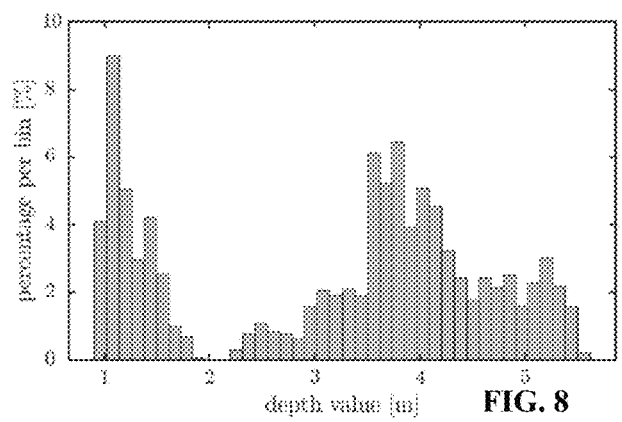
FIG. 8 is a depth histogram based on the example depth image of FIG. 7 in accordance with some implementations.

In some implementations, the depth data or depth map is analyzed to identify depth distribution data that is used to separate the image portions into different focal depth planes. Such depth distribution data can be visualized or otherwise represented in a depth histogram. FIG. 8 is a depth histogram based on the example depth image of FIG. 7. In some implementations, threshold determination techniques are used to determine one or more divisions of pixels of an image to assign to two or more focal depth planes. Such thresholds can be determined by identifying bins/groups of pixels within particular depth ranges and then selecting thresholds corresponding to low points (e.g., minimum(s)), e.g., one or more bins having the least number of pixels, bins having at least of threshold number fewer pixels than the maximum number in any bin, etc. For example, a low point illustrated in the depth histogram illustrated in FIG. 7 occurs around 2 m. Based on identifying this low point, the depth threshold of 2 m can be selected as the threshold for assigning pixels to different focal depth planes, e.g., pixels having a depth value of less than 2 m can be assigned to the foreground focal depth plane, while pixels having a depth value of more than 2 m can be assigned to the background focal depth plane. In some implementation, the algorithm used to assign portions of the image to focal depth planes involves computing a histogram of the scene depicted in an image, determining if the scene in the image should be split based on the distribution represented by the histogram, and estimating an optimal segmentation based on the distribution represented by the histogram.

In some implementations, a threshold is used to define a separator between two planes.

$$FG(x, y) = \begin{cases} 1 & \text{if } d(x, y) \le d_t \\ 0 & \text{otherwise} \end{cases}$$

Such separators may be used to configure versions of images in a sequence of images for different focal depth planes.

Figure 9:
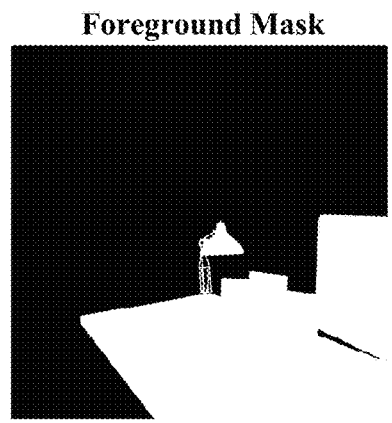
FIG. 9 is an example foreground mask based on the example depth histogram of FIG. 8 in accordance with some implementations.

In some implementations, one or more thresholds are used to create one or more masks. For example, the depth threshold of 2 m can be used to generate a foreground mask or a background mask. FIG. 9 is an example of a foreground mask based on the example depth histogram of FIG. 8 in accordance with some implementations. Some implementations use such masks to configure alternating images for different focal depth planes. Each image is pre-processed to be displayed on one of the multiple focal depth planes and is displayed in conjunction with the use of an appropriately powered lens on the HMD. For example, a first image may be pre-processed to facilitate viewing portions of the image within the foreground using a short distance focal depth plane, and a second image may be pre-processed to facilitate viewing portions of the image within the background using a more distant focal depth plane, etc. These images are then presented in conjunction with the use of an appropriate powered lens. For example, the first image may be displayed while a lens power associated with the short distance plane is active in the HMD, and the second image may be displayed while a lens power associated with the more distant plane is active in the HMD, etc. If the frame rate of the alternating images is sufficiently fast, the user experience will include near objects that require the user's eye to focus on a close focal depth plane and far objects that require the user's eye to focus on the far focal depth plane. This may reduce VAC conflict by allowing the eye to change accommodation in a certain direction.

Technique for Adjusting an Image

In some implementations, some of the portions of each of the alternating images are entirely removed. For example, a first image may have only foreground content, a second image may have only background content, and a third image may have only foreground content, etc. As a specific example, to create a background content only version of an image, a mask may be applied to the luma channel (e.g., representing the brightness of the image) so that none of the foreground portions of the image will be in the adjusted image. To create a foreground content only version of an image, a mask may be applied to the luma channel so that none of the background portions of the image will be in the adjusted image. In these examples, each altered image includes only the portions associated with its focal depth plane, e.g., the near focal depth plane version of the image includes only portions of the image associated with the near focal depth plane and the far focal depth plane version of the image includes only portions of the image associated with the far focal plane. The other portions of each of these images are empty, which may reduce the overall brightness of the content over time and increase the possibility of noticeable flickering.

In some implementations, these other portions (e.g., the portions not associated with the image version's focal depth plane) are not entirely removed. For example, a first version of an image may have the high frequency part boosted for portions associated with a near focal depth plane and reduced for other portions. The second version of the image may have the high frequency part boosted for portions associated with a far focal depth plane and reduced for other portions. In this way, the portions of each image are altered to preserve the alternating focal depth plane aspects of the alternating images without excluding all content from some portions of the image. Doing so can avoid or limit the amount of overall brightness lost and avoid or limit noticeable flickering. Such techniques may still involve the use of the foreground mask or other masks, but use those masks to change frequency-specific parts of the image for the different image portions rather than to remove content entirely from portions of the image.

Alternating images in which the high frequency part of a given portion is boosted with images in which the high frequency part of the given portion is reduced generally results in an accurate user experience. From the user's perception perspective, the average contrast ends up being sufficient to enable the user to see contrast that is the same as original image. For example, when the user is focused on a near focal depth plane, the images corresponding to that focal depth plane will have their high frequency part boosted for objects on that focal depth plane. This compensates for the reduced high frequency parts for those portions in the other images which are for the far focal plane. The user focusing on the near focal depth plane is able to clearly see the objects associated with that focal depth plane In addition to the possible benefits of avoiding brightness reduction and noticeable flickering, the technique may be implemented using a hardware-friendly pipeline or software and a graphics processing unit (GPU) with minimal computations and thus can be implemented quickly, efficiently, and with limited processing, storage, and energy resource requirements.

Adjusting the high frequency part of different portions (e.g., pixels) of an image can be accomplished using various techniques. In some implementations, the frequency space of an image is separated, for example, into a high-frequency part and a low frequency part and these different parts are used to adjust different portions of an image.

The following example illustrates an exemplary technique for creating alternative versions of an image using frequency separation of the image. In this example, the image (e.g., FIG. 6) is separated into a low frequency part and a high frequency part.

$$I = I_{LP} + I_{HP}$$

Figure 10:
FIG. 10 is an example image low frequency part of the image of FIG. 6 in accordance with some implementations.
Figure 11:
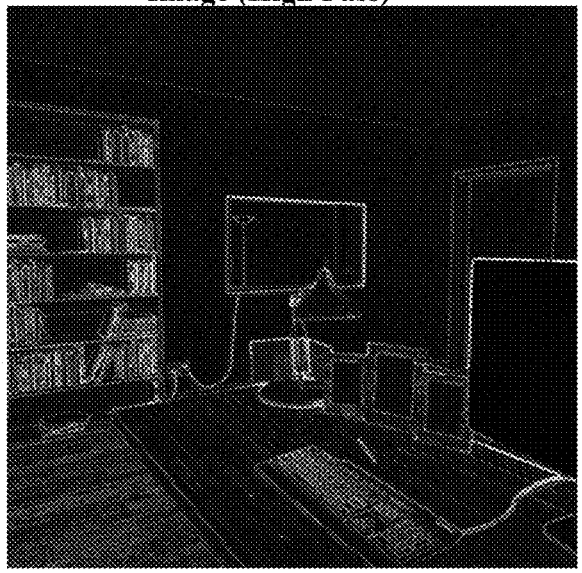
FIG. 11 is an example image high-frequency part of the image of FIG. 6 in accordance with some implementations.

FIG. 10 is an example image low frequency part ($I_{LP}$) of the image of FIG. 6. FIG. 11 is an example image high-frequency part ($I_{HP}$) of the image of FIG. 6.

In some implementations, the low frequency part $I_{LP}$ is displayed in out of focus portions (e.g., those portions not associated with the image versions focal depth plane) and the high-frequency part is displayed for in-focus portions (e.g., those portions associated with the image versions focal depth plane) of each of the alternating images. However, the high-frequency part may be mostly dark, so this could result in reduced overall brightness.

To overcome this, in some implementations, the low frequency part is displayed in all of the images. This can involve creating adjusted images by adjusting (e.g., reducing or boosting) the high-frequency part of the images. The high-frequency part of each portion is adjusted based on which of the multiple focal depth planes is associated with the respective portion. For example, in some frames, the high-frequency part is boosted for near portions and reduced for far portions, while in other frames the high-frequency part is reduced for near portions and boosted for far portions.

Some implementations create and use temporary images to selectively adjust the high-frequency part of certain portions of an image. For example, this may involve creating a temporary image $I_A$ with reduced high frequency and a temporary image $I_B$ with boosted high frequencies:

$$I_A = I - I_{HP}$$

$$I_B = I + I_{HP}$$

Over time $I_A$ and $I_B$ average with one another to provide a natural amount of the high frequency part.

$$I = 0.5 * (I_A + I_B)$$
$$= 0.5 * ((I - I_{HP}) + (I + I_{HP}))$$
$$= I$$

The only error introduced is possible clamping, e.g., $I_A$ may contain values <0, and $I_B$ may contain values >0. Next, the image is segmented into foreground and background. Foreground is defined to be closer than a defined threshold. The temporary images $I_A$ and $I_B$ can then be used to assemble an appropriate focus-plane-specific version of the image, e.g., for either of the two focal depth planes.

$$I'_A = FG * I_A + (1-FG) * I_B$$

$$I'_B = (1-FG) * I_A + FG * I_B$$

Figure 12:
FIG. 12 is an example of a version of the image of FIG. 6 in which the high-frequency part is reduced for close portions and boosted for far portions in accordance with some implementations.
Figure 13:
FIG. 13 is an example of a version of the image of FIG. 6 in which the high-frequency part is boosted for close portions and reduced for far portions in accordance with some implementations.

FIG. 12 is an example of a version ($I'_A$) of the image of FIG. 6 in which the high-frequency part is reduced for close portions and boosted for far portions in accordance with some implementations. FIG. 13 is an example of a version ($I'_A$) of the image of FIG. 6 in which the high-frequency part is boosted for close portions and reduced for far portions in accordance with some implementations.

Note that the amount of overall blur can be controlled, e.g., $$I_A = I - \alpha * I_{HP}$$

$$I_B = I + \alpha * I_{HP}$$

with 2 [0 ... 1].

High frequency errors may occur due to the clamping of displayable values mentioned above, e.g., in the case of very white and very black portions of the image. To the extent that an image has very white or very black portions, there may be some resolution/contrast loss. However, the significance of this issue may be greatly reduced by the relative rarity of very white and very black portions in the images.

Figure 14:
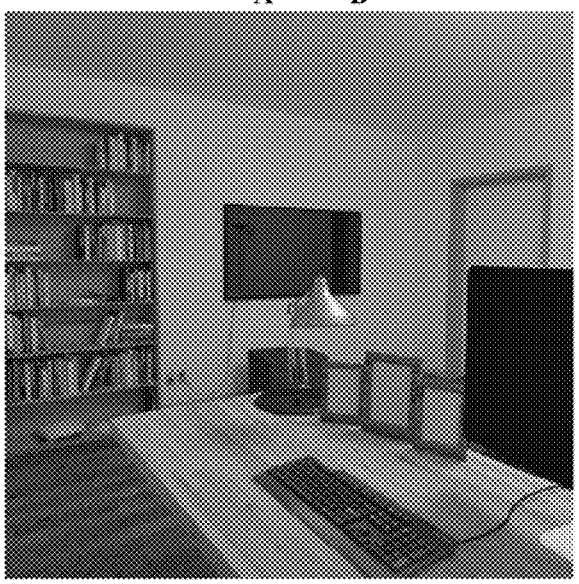
FIG. 14 is a depiction illustrating how a combined image formed by the versions of the image of FIGS. 12 and 13 is sharp (e.g., in focus) in all portions.
Figure 15:
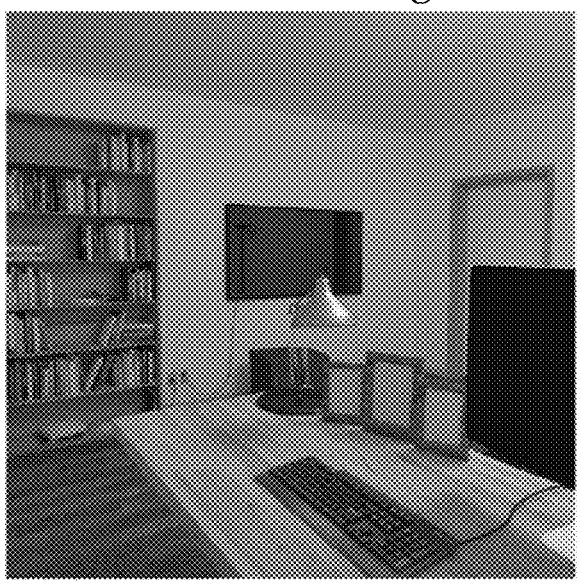
FIG. 15 is a depiction of the image of FIG. 6 provided for reference.

FIG. 14 is a depiction illustrating how a combined image formed by the versions of the image of FIGS. 12 and 13 is sharp (e.g., in focus) in all portions. This depiction illustrates that no matter where the user looks, he or she will see sharp, in focus content comparable to the depiction shown in FIG. 15 of the reference image.

In some implementations, more than two focal depth planes are used. For a given image in the alternating images, the portions of the image in one plane will be in focus and portions in the other plane will be out of focus. The high frequency part boost associated with the portions of the in-focal depth plane will equal the combined reduction of the high frequency part of the portion in the other frames. For example, a pixel's high frequency part may be boosted by 50% in one frame and reduced by 25% in each of the next two frames, etc.

In some implementations, multiple focal depth planes (e.g., 4 planes) are used, but the alternating images use only a subset of those planes during particular time segments. The subset for a given time segment may be based on the object or focal depth plane at which the user is currently looking. For example, if the user is looking at an object in the closest plane, the alternating planes may be only the closest plane and the second closest plane and the third and fourth planes may not be included in the alternation. At a later point during the user experience, the system may detect that the user is looking at an object in the farthest plane and switch to alternating images that focus on the third and fourth planes and the first and second planes may not be included in the alternating frames.

Figure 16:
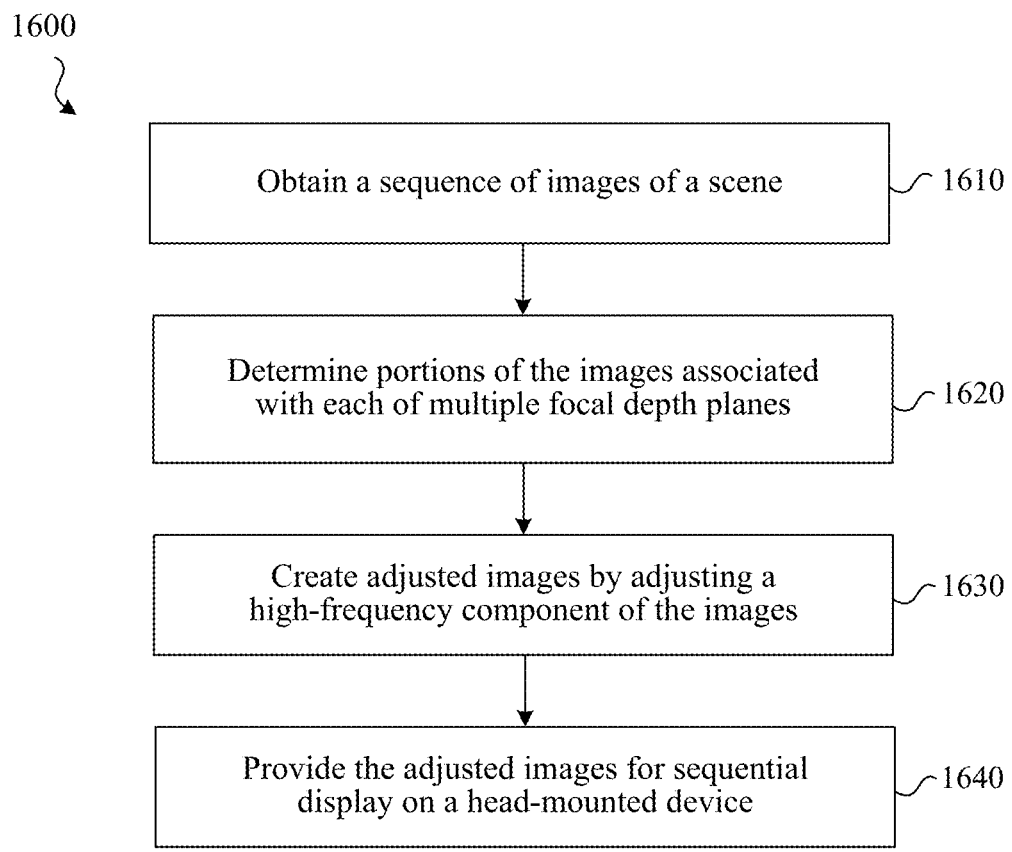
FIG. 16 is a flowchart representation of a method of multi-focus rendering in accordance with some implementations.

FIG. 16 is a flowchart representation of a method 1600 of multi-focus rendering of a user experience in accordance with some implementations. In some implementations, the method 1600 is performed by a device (e.g., controller 110 of FIGS. 1 and 2), such as a mobile device, desktop, laptop, or server device). In these examples, the device and the HMD are separate devices and the device may wirelessly receive the images from the HMD or transmit the images to the HMD. In other implementations, the method 1600 is performed on a device (e.g., HMD 120 of FIGS. 1 and 3) that has one or more displays for displaying images and thus some or all of the features of method 1600 may be performed on the HMD itself. In some implementations, the method 1600 is performed by processing logic, including hardware, firmware, software, or a combination thereof. In some implementations, the method 1600 is performed by a processor executing code stored in a non-transitory computer-readable medium (e.g., a memory).

The user experience of method 1600 may include a sequence of images (e.g., a sequence of frames or other images) displayed on at least a portion of a display space of a display of the HMD and viewed through one or more lenses of the HMD. For example, content, such as a movie, a sequence of images depicting three dimensional (3D) content, a series of computer-generated reality (CGR) images may be presented on the HMD or provided to the HMD for presentation. The images may include any content that is displayed on some or all of a display space. Each image may replace some or all of a previous image in a sequence, e.g., according to a frame rate. In some implementations, an image entirely replaces a prior image in the sequence in the display space of the display. In some implementations, an image replaces only a portion of the display space and some or all of the remaining portions of the display space are occupied by content from a prior image in the sequence or seen through a see-through-display.

At block 1610, the method 1600 obtains a sequence of images of a scene. For example, the sequence of images of the scene may include images of real world or computer-generated reality (CGR) content to be rendered on a display at a frame rate (e.g., 120 fps).

At block 1620, the method 1600 determines portions (e.g., pixels) of the images associated with each of multiple focal depth planes. For example, some pixels of each image may be assigned to a foreground plane and other pixels may be assigned to a background plane. Determining which portions are associated with which planes may involve creating a foreground mask, for example, as depicted in FIGS. 6-9. More than two focal depth planes can be used, e.g., a first set of pixels may be associated with a first focal depth plane, a second set of pixels may be associated with a second focal depth plane, and a third set of pixels may be associated with a third focal depth plane, etc. The segmentation (e.g., foreground v. background) can be based on depth maps or other depth information about the pixels in the images or the real or virtual objects depicted by those pixels. Such determinations can be based on a mask (e.g., a foreground mask or a background mask) determined based on depth information for the images from a depth sensor or 3D model of the scene.

As illustrated in FIGS. 6-9 and discussed with reference thereto above, segmentation can be determined based on pixel depth histograms. In some implementations, determining the portions of the images associated with each of the multiple focal depth planes involves obtaining depth information identifying depth of objects corresponding to pixels of the images, identifying a distribution of pixel depths (e.g., how many pixels are associated with particular depth classes (0-2 feet, 2-4 feet, 4-8 feet, etc.), which could be graphically represented on a histogram), and determining the multiple focal depth planes based on the distribution of pixel depths and focal depth plane selection criteria (e.g., content with less depth variance may require fewer focal depth planes).

At block 1630, the method 1600 creates adjusted images by adjusting (e.g., reducing or boosting) a high-frequency component of the images. In some implementations, creating the adjusted images involves creating images of a first focus type (e.g., near objects in focus) in which first portions associated with a first focal depth plane are in focus and second portions associated with a second focal depth plane are out of focus and creating images of a second focus type (e.g., far objects in focus) in which the second portions are in focus and the first portions are out of focus. In some implementations, creating the adjusted images involves, for images of the first focus type, boosting the high-frequency part of the first portions and reducing the high-frequency part of the second portions and, for images of the second focus type, boosting the high-frequency part of the second portions and reducing the high-frequency part of the first portions. As illustrated in FIGS. 12-13 and discussed with reference thereto above, different versions of an image can be created by reducing and boosting particular portions of an image. FIG. 12 is an example of a version ($I'_A$) of the image of FIG. 6 in which the high-frequency part is reduced for close portions and boosted for far portions and FIG. 13 is an example of a version ($I'_A$) of the image of FIG. 6 in which the high-frequency part is boosted for close portions and reduced for far portions. A sequence of alternating adjusted images of the first focal type and adjusted images of the second focal type can be created.

Adjusted images of a third focal type in which third portions associated with a third focal depth plane are in focus and the first portions and the second portions are out of focus can be created. In this example, for images of the first focus type, the high-frequency part of the first portions is boosted and the high-frequency part of the second portions and the third portions is reduced. For images of the second focus type, the high-frequency part of the second portions is boosted and the high-frequency part of the first portions and the third portions is reduced. For images of the third focus type, the high-frequency part of the third portions is boosted and the high-frequency part of the first portions and the second portions is reduced. A sequence of alternating adjusted images is created and includes the adjusted images of the first focal type, the adjusted images of the second focal type, and the adjusted images of the third focal type.

At block 1640, the method 1600 provides the adjusted images for sequential display on a head-mounted device. The HMD may be same device or a different device as the device that performs elements 1610-1640 of FIG. 16. In some implementations, a sequence of images is identified for display on an HMD, and some of the images (e.g., the first image, third image, fifth image, etc.) are adjusted for display using a first focal depth plane and others of the images are (e.g., the second image, fourth image, sixth image, etc.) are adjusted for display using a second focal depth plane. In some implementations, the adjustments occur in real time. For example, if the some or all of the content is real time content from a camera on the HMD, each frame may be adjusted and then displayed, e.g., the camera captures a first image, the first image is adjusted and displayed, then camera captures a second image and the second image is adjusted and displayed, etc. As illustrated in FIGS. 12-13 and discussed with reference thereto above, different versions of an image can be created by reducing and boosting particular portions of an image. In the present example, the images of the sequence can each similarly be adjusted by an appropriate technique, e.g., the first image adjusted using a first focal depth plane, the second image adjusted using a second focal depth plane, etc.

Techniques for Accounting for the Naturally-Occurring Blur of the Eyes

Some implementations, as discussed above, provide multi-focus display systems that can display images at multiple focus distances on HMDs. Such systems can be invariant with respect to the user's gaze and focus. In some implementations or circumstances this may be beneficial. However, in other implementations or circumstances it may be advantageous to account for the user's gaze or focus. Some implementations provide a gaze/focus dependent system that takes into account the naturally occurring blur of the eye's optical system.

Generally, a system can render a foreground object in a near plane and a background object in a far plane at different locations. In this example, these objects are rendered without any blur or frequency boost. When a human observer focuses on the foreground object, the background object appears blurred and vice versa. This is due to the human eye's lens and depends on the accommodation state (e.g., which may depend on the brightness of the environment).

As discussed above, some implementations divide a view (e.g., into foreground and background) and use frequency boost/reduction to display images at multiple focal distances. When focusing on the foreground object (e.g., on the foreground plane), the frequency-reduced background may be further blurred by the human optical system. The system may detect or infer where the user is currently looking and compensate for this additional/secondary blur of the background by adding a compensating loss to the foreground. For opaque objects, the system may determine that the user would focus on the foreground and, accordingly, further enhance the foreground image. In cases of multiple depths per object (e.g., glass or reflections on a screen) or if foreground/background are close by, determining where the user currently is looking can further inform the presentation of the objects to account for the naturally occurring blur of the eye's optical system.

Techniques for Dynamic Adjustment

Some implementations, as discussed above, provide multi-focus display systems that can display images at multiple focus distances on HMDs. In some of these implementations, the division of images for multiple focal distances is dynamically updated, for example, during particular eye states. For example, this can involve dynamically updating a mask (e.g., foreground/background mask) or other multi-plane segmentation during blinks or saccades (e.g., during quick movements of the eyes between phases of fixation). For example, when looking at the screen in front of a wall, those two objects might be appropriate for foreground/background segmentation but when gazing towards a window in the wall, the wall and window versus outside the window might be an appropriate foreground/background segmentation. The switch can be made during a blink or saccade. In general, for creating a depth histogram, determining where the user looks can be beneficial in selecting how to segment or when to transition from using one segment to another segment. The segmentation changes can be effectively hidden during blinks or saccades.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
    at an electronic device having a processor:
        obtaining a sequence of images of a scene;
        determining portions of the images associated with each of multiple focal depth planes;
        creating adjusted images by adjusting a high-frequency part of each portion based on which of the multiple focal depth planes is associated with the respective portion; and
        providing the adjusted images for sequential display on a head-mounted device (HMD).

2. The method of claim 1, wherein creating the adjusted images comprises:
    creating images of a first focus type in which first portions associated with a first focal depth plane are in focus and second portions associated with a second focal depth plane are out of focus; and
    creating images of a second focus type in which second portions associated with the second focal depth plane are in focus and first portions associated with the first focal depth plane are out of focus.

3. The method of claim 2, wherein creating the adjusted images comprises:
    for images of the first focus type, boosting the high-frequency part of the first portions and reducing the high-frequency part of the second portions; and
    for images of the second focus type, boosting the high-frequency part of the second portions and reducing the high-frequency part of the first portions.

4. The method of claim 2, wherein creating the adjusted images comprising creating a sequence of alternating adjusted images of the first focal type and adjusted images of the second focal type.

5. The method of claim 2, wherein creating the adjusted images comprises:
    creating images of a third focus type in which third portions associated with a third focal depth plane are in focus and the first portions and the second portions are out of focus.

6. The method of claim 5, wherein creating the adjusted images comprises for images of the first focus type, boosting the high-frequency part of the first portions and reducing the high-frequency part of the second portions and the third portions;
for images of the second focus type, boosting the high-frequency part of the second portions and reducing the high-frequency part of the first portions and the third portions; and
for images of the third focus type, boosting the high-frequency part of the third portions and reducing the high-frequency part of the first portions and the second portions.

7. The method of claim 5, wherein creating the adjusted images comprising creating a sequence of alternating adjusted images of the first focal type, adjusted images of the second focal type, and adjusted images of the third focal type.

8. The method of claim 1, wherein determining the portions of the images associated with each of the multiple focal depth planes comprises:
determining portions of the images associated with a foreground focal depth plane; and
determining portions of the images associated with a background focal depth plane.

9. The method of claim 1, wherein determining the portions of the images associated with each of the multiple focal depth planes comprises:
determining a mask based on depth information for the images.

10. The method of claim 1, wherein determining the portions of the images associated with each of the multiple focal depth planes comprises:
obtaining depth information identifying depth of objects corresponding to pixels of the images;
identifying a distribution of pixel depths; and
determining the multiple focal depth planes based on the distribution of pixel depths and focal depth plane selection criteria.

11. The method of claim 1 further comprising:
detecting a current focus of an eye; and
compensating for naturally-occurring blur of the eye associated with a first depth plane on content associated with another depth plane.

12. The method of claim 1 further comprising:
determining to change a segmentation of the multiple focal depth planes;
detecting a blink or saccade; and
changing the segmentation of the multiple focal depth planes during the blink or saccade.

13. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
a sequence of images of a scene;
determining portions of the images associated with each of multiple focal depth planes;
creating adjusted images by adjusting a high-frequency part of each portion based on which of the multiple focal depth planes is associated with the respective portion; and
providing the adjusted images for sequential display on a head-mounted device (HMD).

14. The system of claim 13, wherein creating the adjusted images comprises:
creating images of a first focus type in which first portions associated with a first focal depth plane are in focus and second portions associated with a second focal depth plane are out of focus; and
creating images of a second focus type in which first portions associated with the second focal depth plane are in focus and second portions associated with the first focal depth plane are out of focus.

15. The system of claim 14, wherein creating the adjusted images comprises:
for images of the first focus type, boosting the high-frequency part of the first portions and reducing the high-frequency part of the second portions; and
for images of the second focus type, boosting the high-frequency part of the second portions and reducing the high-frequency part of the first portions.

16. The system of claim 14, wherein creating the adjusted images comprising creating a sequence of alternating adjusted images of the first focal type and adjusted images of the second focal type.

17. The system of claim 14, wherein creating the adjusted images comprises:
creating images of a third focus type in which third portions associated with a third focal depth plane are in focus and the first portions and the second portions are out of focus.

18. The system of claim 17, wherein creating the adjusted images comprises:
for images of the first focus type, boosting the high-frequency part of the first portions and reducing the high-frequency part of the second portions and the third portions;
for images of the second focus type, boosting the high-frequency part of the second portions and reducing the high-frequency part of the first portions and the third portions; and
for images of the third focus type, boosting the high-frequency part of the third portions and reducing the high-frequency part of the first portions and the second portions.

19. The system of claim 17, wherein creating the adjusted images comprising creating a sequence of alternating adjusted images of the first focal type, adjusted images of the second focal type, and adjusted images of the third focal type.

20. A method, comprising:
at an electronic device having a processor:
obtaining a sequence of images of a scene;
obtaining depth information identifying depth of objects corresponding to pixels of the images;
identifying a distribution of pixel depths based on the depth information, the pixel depths corresponding to depth of individual pixels of the images;
determining multiple focal depth planes based on the distribution of pixel depths and focal depth plane selection criteria;
determining portions of the images associated with each of multiple focal depth planes;
creating adjusted images based on which of the multiple focal depth planes is associated with the portions; and
providing the adjusted images for sequential display on a head-mounted device (HMD).

21. The method of claim 20, wherein determining portions of the images associated with each of multiple focal depth planes comprises:
  determining a threshold based on the distribution of pixel depths; and
  determining the portions of the images associated with each of multiple focal depth planes based on the threshold.

* * * * *